(12) United States Patent
Sabate

(10) Patent No.: US 6,424,101 B1
(45) Date of Patent: Jul. 23, 2002

(54) ELECTRONIC BALLAST WITH FEED-FORWARD CONTROL

(75) Inventor: Juan A. Sabate, Saratoga Springs, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/730,430

(22) Filed: Dec. 5, 2000

(51) Int. Cl.$^7$ ................................................ G05F 1/00
(52) U.S. Cl. .................... 315/307; 315/291; 315/224
(58) Field of Search ......................... 315/307, 291, 315/DIG. 5, 209, 224, 297

(56) References Cited

U.S. PATENT DOCUMENTS

| | | | |
|---|---|---|---|
| 4,560,908 A | 12/1985 | Stupp et al. | 315/219 |
| 4,701,671 A | 10/1987 | Stupp et al. | 315/224 |
| 5,365,152 A | * 11/1994 | Ozawa et al. | 315/291 |
| 5,382,882 A | 1/1995 | Nerone | 315/307 |
| 5,402,043 A | 3/1995 | Nilssen | 315/307 |
| 5,481,162 A | * 1/1996 | Boenigk et al. | 315/307 |
| 5,834,882 A | 11/1998 | Bishop | 310/359 |
| 5,856,728 A | 1/1999 | Zimnicki et al. | 315/209 PZ |
| 5,872,429 A | * 2/1999 | Xia et al. | 315/194 |
| 6,034,484 A | 3/2000 | Danov et al. | 315/209 PZ |
| 6,052,300 A | 4/2000 | Bishop et al. | 363/131 |
| 6,072,710 A | 6/2000 | Chang | 363/132 |
| 6,104,141 A | 8/2000 | Ganser et al. | 315/209 PZ |
| 6,172,466 B1 | * 1/2001 | Ki et al. | 315/224 |

OTHER PUBLICATIONS

"Self–Oscillating Electronic Ballast Analysis Via Relay Systems Approach", by Chang et al, IEEE, 1999.
"Analysis of the Self–Oscillating Series Resonant Inverter for Electronic Ballasts", by Chang et al, IEEE Transactions on Power Electronics, vol. 14, No. 3, May 1999.
"Inductor–less Piezoelectric Transformer Ballast for Linear Fluorescent Lamps", by Lin et al, 2000 Power Electronics Seminar Proceedings, Sep. 17–19, 2000.

* cited by examiner

Primary Examiner—Don Wong
Assistant Examiner—Tuyet T. Vo

(57) ABSTRACT

An electronic ballast which is capable of compactly powering a discharge lamp from a source of rectified, but unregulated, power having a varying DC voltage. The ballast includes a selfoscillating converter powered by the DC voltage for producing pulses at a nominal operating frequency which is determined by a resonant tank. The resonant tank converts the pulses to a sinusoidal current for powering the discharge lamp and includes an inductive impedance.in series with the lamp for providing a voltage drop which varies with the operating frequency. A feed-forward control circuit is coupled to the converter for automatically varying the operating frequency directly with variations in the DC source voltage. The voltage drop across the inductive impedance is substantially proportional to the magnitude of the DC source voltage. This enables regulation of the voltage supplied to the discharge lamp by the ballast without sensing the lamp voltage itself.

19 Claims, 3 Drawing Sheets

ELECTRONIC BALLAST WITH FEED-FORWARD CONTROL

BACKGROUND OF THE INVENTION

1. Field of the Invention

This invention relates to electronic ballasts for discharge lamps such as fluorescent lamps and, in particular, to such ballasts which are useful in applications where compact size is desirable.

2. Description of Related Art

There is an ever-increasing demand for smaller electronic ballasts. In order to achieve this goal, a variety of problems must be overcome, for example:

If the operating frequency of ballast circuitry is increased sufficiently to achieve a substantial reduction in the sizes of magnetic and filtering elements, power losses tend to increase.

Decreasing the size of filtering components tends to have a negative impact on circuit performance.

SUMMARY OF THE INVENTION

It is an object of the invention to provide an electronic ballast for discharge lamps which can be made compact without substantially increasing cost or adversely affecting performance.

In accordance with the invention, an electronic ballast includes a source of power having a varying DC voltage, a self-oscillating converter powered by the DC voltage for producing pulses at a controlled frequency, a resonant tank for converting the pulses to an alternating current for powering a discharge lamp, and a feed-forward control circuit for effecting variation of the frequency in response to variations of the DC voltage, the resonant tank having a voltage drop which varies directly with said frequency.

Such a ballast does not require a regulated DC power supply and will operate effectively with a filter capacitor that is much reduced in size from capacitors that are typically used to reduce ripple of the rectified DC power.

A self-oscillating resonant converter circuit for operating discharge lamps, which does not require a regulated DC power supply, is described U.S. Pat. No. 6,072,710. However, that circuit utilizes a feed-back approach. In accordance with the invention, a feed-forward approach is utilized which is inherently more stable and has a greater range of correction for variations of the DC source voltage.

DESCRIPTION OF THE PREFERRED EMBODIMENT(S)

Figure 1:
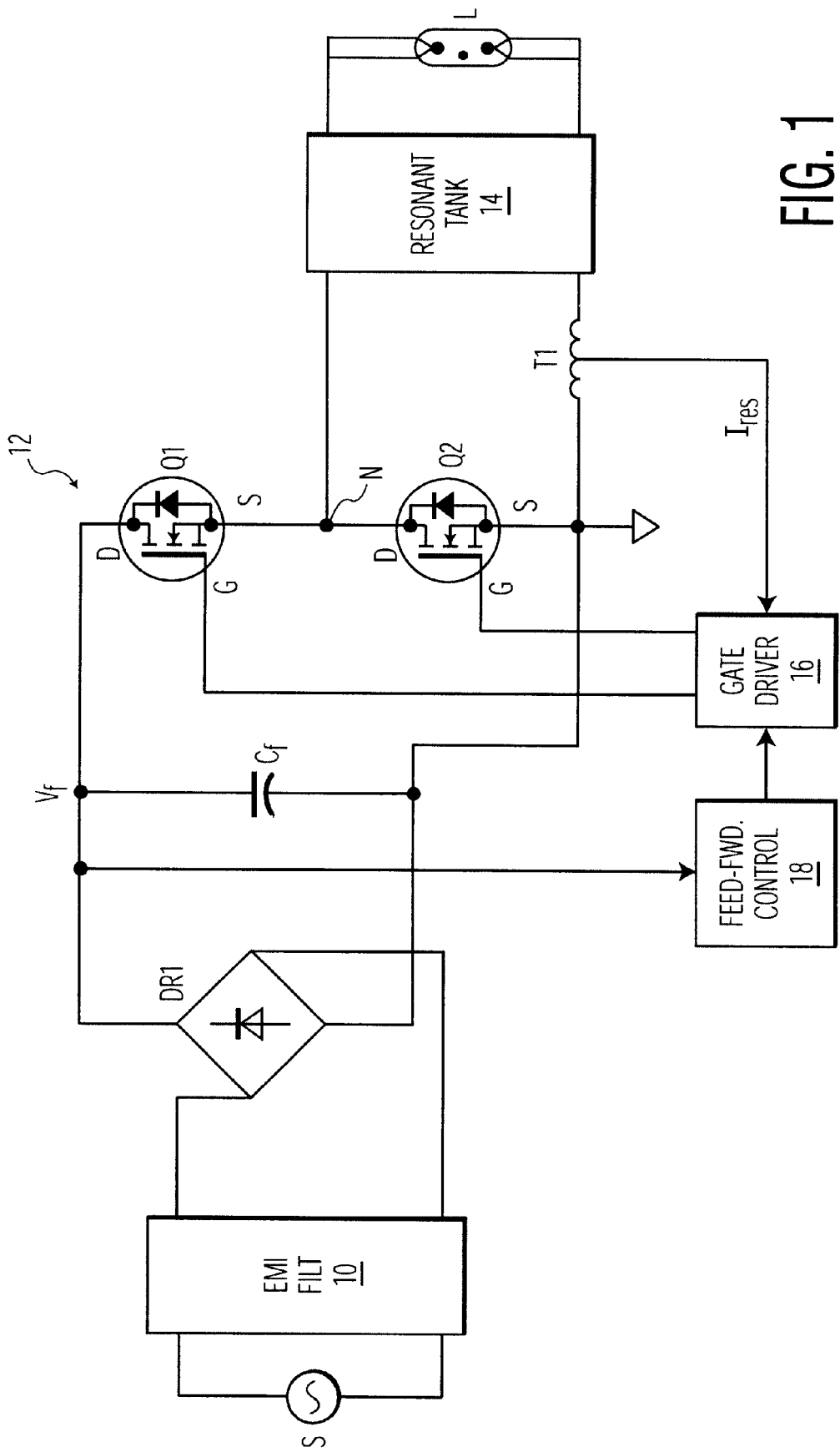
FIG. 1 is a combination block and schematic diagram of a system including a ballast in accordance with an embodiment of the invention.

The exemplary system shown in FIG. 1 includes a source of AC power S, a discharge lamp L (e.g. a fluorescent lamp) and a ballast for controllably passing power to the lamp from the source S. The ballast includes an EMI filter 10, a bridge rectifier DR1, a line-filter capacitor $C_f$, a half-bridge converter 12, a resonant tank 14 (e.g. a multi-layered piezoelectric transformer), a current transformer T1, a gate driver circuit 16 and a feed-forward control circuit 18.

The EMI filter 10 serves to isolate the AC power source S from interference signals generated within the ballast (e.g. high-frequency switching signals generated by the converter 12).

The bridge rectifier DR1 and the filter capacitor $C_f$ convert the AC power from the source S to rectified, but unregulated, DC power having a varying DC voltage $V_f$. Together, this rectifier and capacitor form a DC power source that is conventional except for its simplicity and the relatively small size of the filter capacitor that is possible because of the ripple compensation provided by the feed-forward control. Alternatively, in a ballast for powering a lamp requiring a higher DC voltage than can be provided by a simple bridge rectifier, a relatively simple voltage-step-up circuit can be substituted.

The half-bridge converter 12 (including serially-connected transistors Q1 and Q2) operates together with the resonant tank 14 to provide power to the lamp L. The converter switches at a nominal high frequency (e.g. 120 kHz) relative to the frequency (e.g. 60 Hz) of the AC source S and alternately connects the resonant tank 14 (via a node N) to the varying DC voltage on the capacitor $C_f$ (through transistor Q1) and then to ground (through transistor Q2).

The resonant tank 14 converts the power provided through transistor Q1 (in the form of DC pulses) to a sinusoidal AC waveform for powering the lamp L. The tank 14 operates at a resonant frequency which is determined primarily by inductance and capacitance in the tank itself and by the impedance of the lamp L.

The current transformer T1 senses the current flowing through the resonant tank and supplies a signal $I_{res}$ representative of this current to a first input of the gate driver circuit 16. In response to this signal, the gate driver applies signals to the gates of the transistors Q1 and Q2 to effect switching of these transistors at the same frequency as that of the sinusoidal AC waveform generated within the resonant tank 14.

Collectively, the converter 12, resonant tank 14, current transformer T1 and gate driver circuit 16, operated as described thus far, form a self-oscillating resonant converter. A known converter of this type is described in greater detail in U.S. Pat. No. 6,072,710, which is hereby incorporated by reference. Contrary to the feed-back control described in that patent, however, control circuit 18 applies a feed-forward signal to a second input of the gate driver 16 to effect an offset of the driving signals applied to the gates, thereby compensating for the variations of the rectified DC supply voltage Vf on the line-filter capacitor $C_f$. Such feed-forward control enables compensation for substantially greater variations in the DC supply voltage, without destabilizing the self-oscillating operation of the resonant converter.

Figure 2:
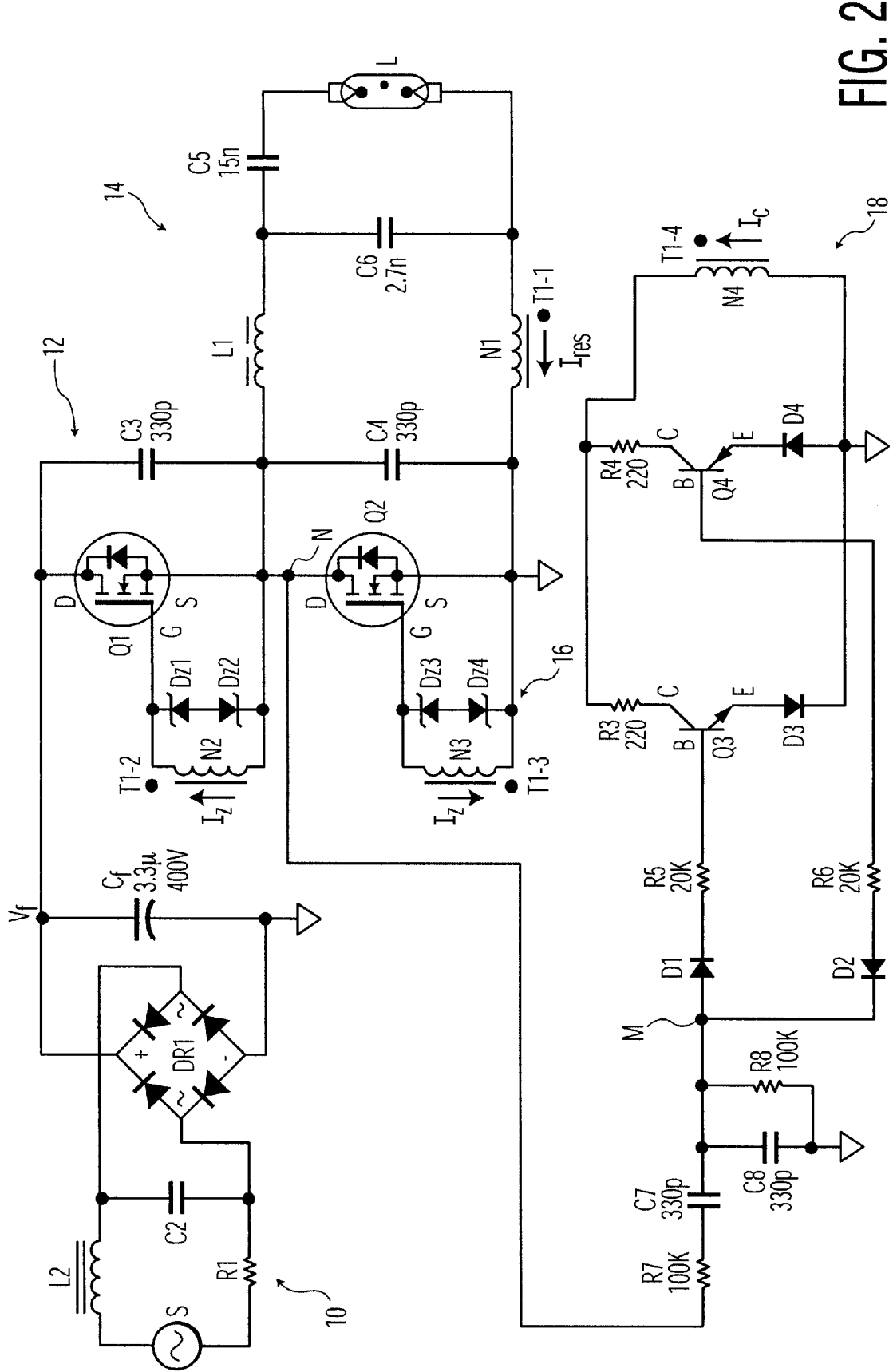
FIG. 2 is a detailed circuit diagram of a system including an exemplary ballast in accordance with the invention.

In the exemplary circuit embodiment shown in FIG. 2, corresponding parts are indicated by the same reference indicia as in FIG. 1. In addition to the circuit elements shown in FIG. 1, a current-limiting resistor R1 is inserted in series with the AC power source S to limit inrush current through the bridge rectifier DR1 when power is initially applied.

The EMI filter is formed by a capacitor C2 for bypassing high-frequency interference signals (generated by the high-frequency switching of the half-bridge converter) to ground and by an inductor L2 for blocking passage of the high-frequency interference signals.

The line filter-capacitor $C_f$ reduces the magnitude of the ripple of the rectified AC power supplied to the converter 12.

Because of the compensation provided by the feed-forward control, the size of this capacitor can be substantially reduced. For example, a circuit having the component values specified in FIG. 2 and having a 3.3 $\mu$f capacitor $C_f$ was used to power a 28 Watt T8 fluorescent lamp at a nominal voltage of 142 Volts RMS. Without the feed-forward control, a 22 $\mu$f capacitor $C_f$ would be required to power the same lamp or the crest factor would substantially increase.

The half-bridge converter 12 is substantially identical to that shown in FIG. 1, but further includes snubber capacitors C3 and C4 connected in parallel with the respective transistors Q1 and Q2. These capacitors serve to reduce energy losses during turn off of the transistors Q1 and Q2, as is well known in the art.

The resonant tank is formed by an inductor L1, by a capacitor C6 in parallel with the lamp L and by the capacitance of the lamp itself. The capacitor C5 has an impedance which is very small compared to that of the lamp and functions primarily as a DC blocking impedance, as is well known in the art.

The current transformer includes windings T1-1, T1-2, T1-3 and T1-4. Winding T1-1 acts as a primary winding for sensing the current $I_{res}$ flowing through the resonant tank. Windings T1-2 and T1-3, together with parallel pairs of serially-connected zener diodes Dz1–Dz2 and Dz3–Dz4, respectively, form the gate driver circuit 16. These zener diode pairs serve to convert current signals $I_Z$ produced by the windings T1-2 and T1-3 to voltage signals $V_Z$ for driving the transistors Q1 and Q2, respectively. These are composite signals of opposite polarity, each representing the sensed instantaneous tank current $I_S$=[N1/N]·$I_{res}$, the transformer magnetizing current $I_{mag}$, and a control current $I_C$ produced by the feed-forward control circuit 18.

The magnitude of the current $I_Z$ produced by each of the windings T1-2 and T1-3 (and passing through the respective zener diode pairs) is equal to one-half of the difference between the sensed tank current $I_S$ and the sum of the magnetizing current $I_{mag}$ plus the control current $I_C$, that is $I_Z$=½·[$I_S$–($I_{mag}$+$I_C$)]. Depending on the instantaneous polarity of $I_Z$ in each of the windings T1-2 and T1-3, one of the transistors Q1/Q2 is ON and the other is OFF. For the polarities of $I_Z$ shown in FIG. 2, Q1 is ON and Q2 is OFF. For the circuit shown in FIG. 2, $I_S$(t)=[N1/N]·$I_{res}$(t), $I_{mag}$(t)=[$V_Z/L_M$]·t, and $I_C$(t) is determined by the feed-forward control circuit, where:

N1, N2, N3, N4 are number of turns of the windings T1-1, T1-2, T1-3, and T1-4, respectively N=N2=N3=N4; and $L_M$ is the magnetizing inductance of T1.

The feed-forward control circuit 18 includes complementary first and second circuits for driving the winding T1-4. The first winding-driver circuit includes an NPN transistor Q3, a resistor R3 connected in series with the collector, a diode D3 connected in series with the emitter, and the series combination of a diode D1 and a resistor R5 connected in series between the base of Q3 and a node M. The second winding driver circuit includes a PNP transistor Q4, a resistor R4 connected in series with the collector, a diode D4 connected in series with the emitter, and the series combination of a diode D2 and a resistor R6 connected in series between the base of Q4 and the node M.

Control circuit 18 further includes a bandpass filter which is formed by the serially-connected combination of a resistor R7 and a capacitor C7 (connected between nodes N and M) and by the parallel-connected combination of a capacitor C8 and resistor R8 (connected between node M and ground). This bandpass filter serves to convert a square-wave signal produced at node N (and having a voltage alternating between approximately $V_f$ and ground) to a triangular-wave signal which is produced at node M. This triangular-wave signal has an amplitude proportional to $V_f$ and varies substantially symmetrically above and below ground potential. The first and second winding-driver circuits operate to produce the control current $I_C$ in the winding T1-4, which is an alternating triangular-wave current having an instantaneous polarity determined by the polarity of the voltage at the node M.

Figure 3A:
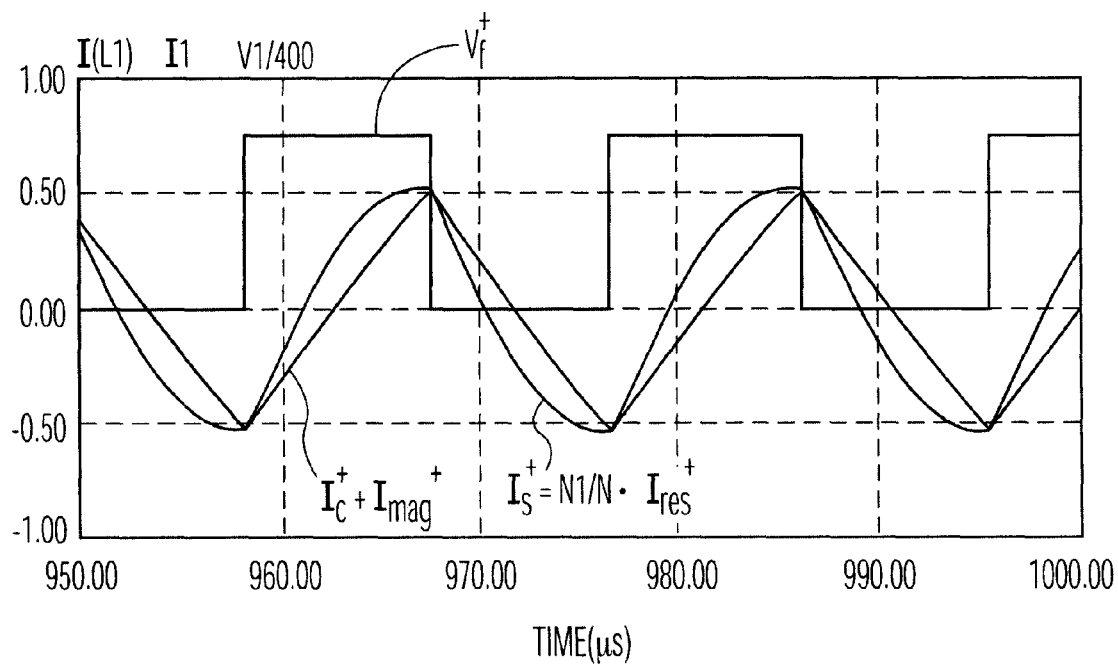
FIGS. 3A and 3B are waveform diagrams illustrating operation of the exemplary ballast of FIG. 2.
Figure 3B:
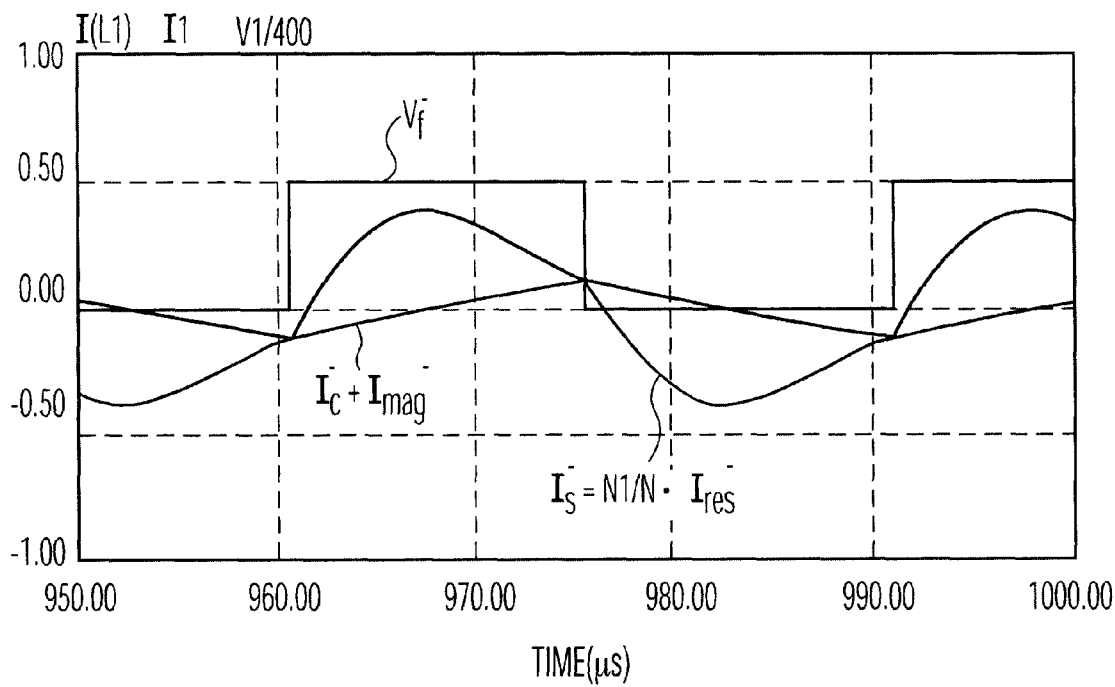

FIGS. 3A and 3B illustrate signals produced, during operation of the exemplary ballast shown in FIG. 2, for two different values of $V_f$. In each of these figures:

the square-wave signal represents the voltage at node N (which is substantially equal to the voltage $V_f$ when the transistor Q1 is conducting);

the triangular-wave signal represents the sum of the magnetizing current $I_{mag}$ and the control current $I_C$; and the sinusoidal-wave signal represents the current $I_{res}$ passing through the winding T1-1.

In operation, the feed-forward control circuit 18 cooperates with the gate-driver circuit 16 to vary the switching frequency of the converter 12 in response to variations of the DC voltage $V_f$. This is done by producing a contributory drive current through the winding T1-4 which varies directly with the magnitude of the triangular waveform signal at node M. Note that the converter transistors Q1 and Q2 change state whenever the sum of the magnetizing current $I_{mag}$ and the control current $I_C$ is equal to the sensed resonant inductor current $I_S$. The contributory drive current through winding T1-4 tends to increase the rate at which the magnetizing current reaches the value of the resonant inductor current. The operating frequency of the converter (and thus of the current $I_{res}$ through the resonant tank) varies directly with the amount of the contributory drive current through the winding T1-4. As is well known in the art, the voltage drop across the resonant inductor L1 varies directly with frequency. Consequently, as the voltage $V_f$ supplied to the tank 14 by the converter 12 varies, the resonant inductor regulates the voltage supplied to the lamp L by dropping more voltage for higher values of $V_f$ and by dropping less voltage for lower values of $V_f$.

By comparison of FIGS. 3A and 3B, operation of the ballast of FIG. 2 at exemplary higher and lower values, respectively, of the DC voltage $V_f$ can be seen. At a higher value of $V_f^+$ (Refer to FIG. 3A.) the complementary transistors Q3 and Q4 supply a higher value of triangular drive current to the winding T1-4 resulting in a current $I_C^+$+$I_{mag}^+$ which rapidly reaches the magnitude of the sensed resonant inductor current $I_S^+$=[N1/N]·$I_{res}^+$. This causes a higher converter frequency $f^+$ and a higher voltage drop across the resonant inductor L1. At a lower value of $V_f^-$ (Refer to FIG. 3B.) the complementary transistors Q3 and Q4 supply a lower value of triangular drive current to the winding T1-4 resulting in a current $I_C^-$+$I_{mag}^-$ which less rapidly reaches the magnitude of the sensed resonant inductor current $I_S^-$=[N1/N]·$I_{res}^-$. This causes a lower converter frequency $f^-$ and a lower voltage drop across the resonant inductor L1.

Note that FIG. 2 represents only one exemplary embodiment of specific circuitry that may be utilized to implement an electronic ballast in accordance with the invention. For example, compactness of the ballast might be further improved by forming the resonant tank with an integral device rather than discrete circuit components. One particularly interesting device is a multi-layered piezoelectric transformer, such as that described in U.S. Pat. No. 5,834, 882, which is hereby incorporated by reference. A fluorescent lamp ballast utilizing such a piezoelectric transformer is described in Ray L. Lin et al., Inductor-less Piezoelectric Transformer Ballast for Linear Fluorescent Lamps, 2000 CPES Power Electronics Seminar Proceedings, Sep. 17–19, 2000, which is hereby incorporated by reference.

What is claimed is:

1. An electronic ballast for powering a discharge lamp, said ballast comprising:
   a. a source of power having a varying DC voltage;
   b. a self-oscillating converter powered by the DC voltage for producing pulses at a controlled operating frequency;
   c. a resonant tank for converting the pulses to an alternating current for powering a discharge lamp, said resonant tank being coupled to the converter to control said operating frequency;
   d. a feed-forward control circuit coupled to the converter for effecting variation of said operating frequency in response to variations of the DC voltage;
   said resonant tank including an inductive impedance having a voltage drop which varies directly with variations in said operating frequency.

2. A ballast as in claim 1 where the resonant tank comprises a piezoelectric transformer.

3. A ballast as in claim 1 including driver circuitry coupled to the converter for controlling the converter operating frequency in response to:
   a. a first signal from the resonant tank representative of the alternating current; and
   b. a second signal from the feed-forward control representative of the varying DC voltage.

4. A ballast as in claim 3 where:
   a. the self-oscillating converter includes alternatelyconducting first and second switching devices having respective first and second control inputs;
   b. the driver circuitry includes a first transformer winding coupled to the first control input for applying a composite signal representative of the alternating current and of the varying DC voltage and a second transformer winding coupled to the second control input for applying a corresponding composite signal of opposite polarity.

5. An electronic ballast comprising a source of power having a varying DC voltage, a self-oscillating converter including alternately-conducting first and second switching devices powered by the DC voltage for producing pulses at a controlled frequency, a resonant tank for converting the pulses to an alternating current for powering a discharge lamp, and a feed-forward control circuit coupled to the switching devices for effecting variation of the switching rate of the switching devices directly with variations of the DC voltage, the resonant tank including an inductive impedance having a voltage drop which varies directly with said frequency.

6. A ballast as in claim 5 where the resonant tank comprises a piezoelectric transformer.

7. The electronic ballast as claimed in claim 5 wherein the feed-forward control circuit provides an open loop compensation of a ripple voltage of the varying DC voltage.

8. The electronic ballast as claimed in claim 5 wherein the feed-forward control circuit is coupled to a control input of the converter so as to supply a control signal thereto which is based upon the entire 360° of the varying DC voltage.

9. The electronic ballast as claimed in claim 5 wherein the feed-forward control circuit is coupled to a control input of the converter so as to supply a control signal thereto, wherein the feed-forward control circuit is devoid of a pulse integrating circuit.

10. The electronic ballast as claimed in claim 5 wherein the feed-forward control circuit derives a first control signal determined by the variations of the DC voltage, and
    means for applying to a control input of the converter a composite control signal based upon said first control signal and a second control signal determined by the resonant tank alternating current.

11. The electronic ballast as claimed in claim 5 wherein the feed-forward control circuit effects the frequency variation in response to a variation in amplitude of the DC voltage.

12. An electronic ballast comprising a source of power having a varying DC voltage, a self-oscillating converter powered by the DC voltage for producing pulses at a controlled frequency, a resonant tank for converting the pulses to an alternating current for powering a discharge lamp, and a feed-forward control circuit for automatically effecting variation of the frequency in response to variations of the DC voltage, the resonant tank having a voltage drop which varies directly with said frequency.

13. A ballast as in claim 12 where the resonant tank comprises a piezoelectric transformer.

14. The electronic ballast as claimed in claim 12 wherein the feed-forward control circuit is coupled to a control input of the converter so as to supply a control signal thereto which is based upon the entire 360° of the varying DC voltage.

15. The electronic ballast as claimed in claim 12 wherein the feed-forward control circuit is coupled to a control input of the converter so as to supply a control signal thereto, wherein the feed-forward control circuit is devoid of a pulse integrating circuit.

16. The electronic ballast as claimed in claim 12 wherein the feed-forward control circuit derives a first control signal determined by the variations of the DC voltage, and
    means for applying to a control input of the converter a composite control signal based upon said first control signal and a second control signal determined by the resonant tank alternating current.

17. The electronic ballast as claimed in claim 12 wherein the feed-forward control circuit is coupled to a control input of the converter so as to supply a control signal thereto, and the feed-forward control circuit includes an input bandpass filter which converts a square-wave signal produced at a node in the converter into a triangular-wave signal whose amplitude is proportional to the varying DC voltage.

18. The electronic ballast as claimed in claim 12 wherein the feed-forward control circuit effects the frequency variation in response to a DC voltage variation other than removal of a part of the phase of the varying DC voltage.

19. The electronic ballast as claimed in claim 12 wherein the feed-forward control circuit effects the frequency variation in response to a variation in amplitude of the DC voltage.

* * * * *